Sept. 18, 1956         R. W. WILSON         2,763,194
VARIABLE CONVERGENCE HITCH LINK STRUCTURE
Original Filed Nov. 1, 1951                 2 Sheets-Sheet 1

INVENTOR.
RAYMOND W. WILSON
BY
*[signature]*
ATTORNEY

Sept. 18, 1956                R. W. WILSON                2,763,194
              VARIABLE CONVERGENCE HITCH LINK STRUCTURE
Original Filed Nov. 1, 1951                              2 Sheets-Sheet 2
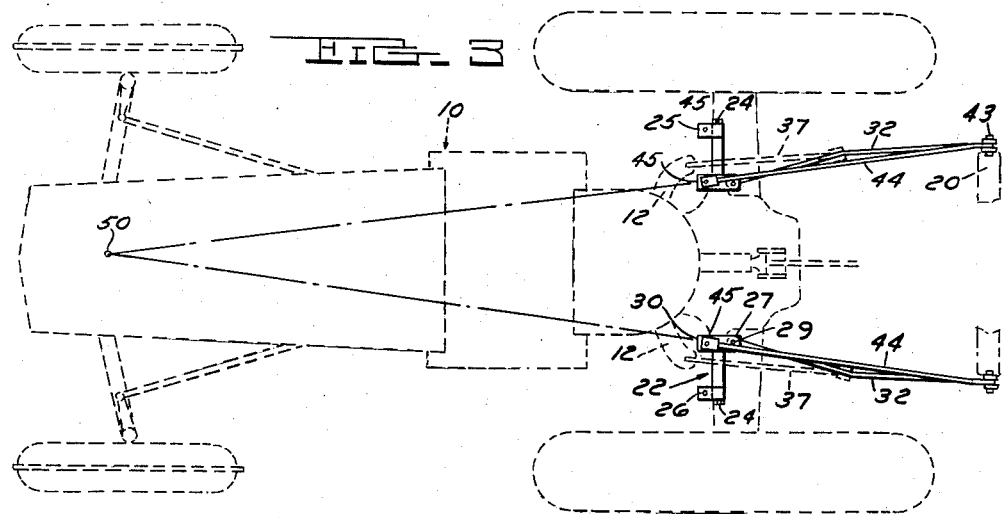
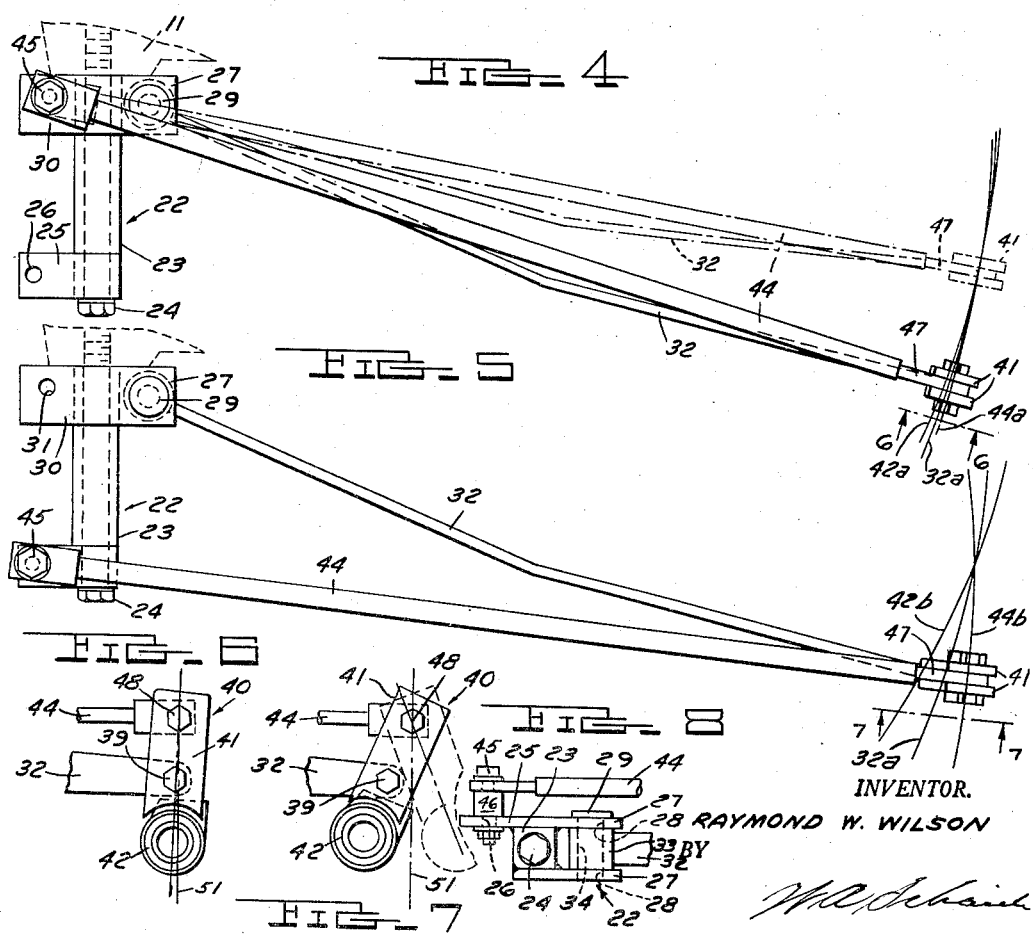
INVENTOR.
RAYMOND W. WILSON
ATTORNEY United States Patent Office 2,763,194
Patented Sept. 18, 1956

2,763,194

VARIABLE CONVERGENCE HITCH LINK STRUCTURE

Raymond W. Wilson, Ferndale, Mich., assignor to Ford Motor Company, Dearborn, Mich., a corporation of Delaware Substituted for abandoned application Serial No. 254,368, November 1, 1951. This application April 12, 1954, Serial No. 422,368

4 Claims. (Cl. 97—47.66)

The present invention relates to variable convergence tractor hitch links, and more specifically to variable convergence links wherein relative lateral tractor-implement movement is translated into implement-steering movement by the differential pivoted movement of a pair of trailing hitch link elements for steering an implement on the linkage about an effective steering point determined by the angular relationship of the link elements in a lateral plane.

This application is a substitute for my application Serial No. 254,368, filed November 1, 1951, now abandoned.

In my earlier filed U. S. Patent 2,653,823, dated September 29, 1953, and in U. S. Patent 2,653,824, also dated September 29, 1953, by Ralph C. Frevik, both of said patents being assigned to the assignee of the present invention, there are disclosed tractor-implement connections including pairs of links each consisting of a pair of trailing link elements connected at their forward ends to laterally spaced portions of the tractor rear axle and connected at their rear ends to an implement cross shaft through laterally extending crank arms. The present invention provides an improved hitch wherein a vertically extending crank arm is utilized for implement steering. Among the advantages gained by the present structure are the improvement of lateral clearance to accommodate greater relative lateral tractor-implement movement, the elimination of universal bearings formerly necessary for the tractor-linkage connection, the simplification of the entire structure to insure lower cost and greater ease of manufacture, and the more accurate determination of the effective steering point by the angular relationship of the link elements.

Structurally, the present invention includes a pair of laterally spaced hitch links each comprising a pair of trailing link elements pivotally attached to an attachment bracket, the link elements being secured to the bracket for lateral movement only and the bracket being attached to the tractor rear axle for vertical pivoting movement only. One of the link elements is adjustable laterally of the bracket to vary the angular relationship of the elements, and the elements of each link are connected at their rear ends to the implement through a vertically extending crank arm. At one adjusted position of the movable link element, the elements of each link are more or less vertically aligned and move laterally in substantially identical arcuate paths, while in another adjusted position, the elements are forwardly divergent and move in substantially differing arcuate paths. In the first named position, the substantially identical paths of travel cause the crank arm to behave as though it were moving about a steering point located at the normal theoretical point of convergence of the pairs of links, i. e., in the vicinity of the tractor front axle. On the other hand, the movement of the elements in widely differing paths causes the effective lengths of the elements to vary more or less drastically and the vertical crank arm is subjected to the resulting differential arcuate movement of the elements. As a result, the implement is steered as though it were pivoted for lateral movement about a steering point located in the vicinity of the tractor rear axle.

It is, therefore, an important object of the present invention to provide an improved tractor hitch link arrangement wherein relative lateral tractor-implement movement is translated into vertical movement at the implement-attaching portions of the linkage for steering the implement about an effective steering point.

Another object is the provision of a variable tractor-implement linkage having laterally spaced link elements each connected to a vertical steering crank arm and effective to steer an implement through the arms about a steering point located by the angular relationship of the link elements.

It is a further important object to provide a tractor-implement linkage wherein the linkage is pivotal about separate horizontal and vertical axes to support an implement for lateral steering movement about a point located on the tractor and determined by the angular relationship between certain of the link elements.

Still another object of the present invention is the provision of a linkage including spaced pairs of trailing link elements connected at corresponding ends to a vertical crank arm and adjustable laterally to different relative angular positions in which the paths of individual link movement in a lateral plane vary more or less drastically to cause a corresponding variance in the longitudinal position of the effective implement steering point.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 3 is a plan view similar to Figure 2 illustrating the linkage in a different adjusted position;

Figure 4 is a greatly enlarged plan view of the linkage alone illustrating the operation of the linkage when in the adjusted position of Figure 3;

Figure 5 is a view similar to Figure 4 illustrating operation of the linkage when in the adjusted condition of Figure 2;

Figure 6 is an elevational view taken along the plane 6—6 of Figure 4;

Figure 7 is a view taken along the plane 7—7 of Figure 5; and

Figure 8 is a fragmentary enlarged side elevational view of the forward portion of the linkage illustrating its attachment to the tractor.

As shown on the drawings:

Figure 1:
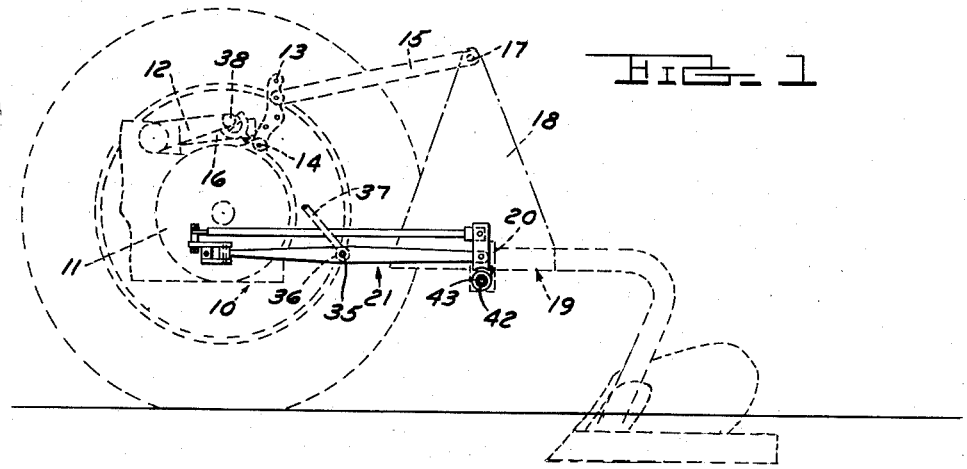
Figure 1 is a side elevational view of a tractor having one wheel removed for clarity and connected to an implement through hitch links of the present invention.

In Figure 1, reference numeral 10 refers generally to a tractor, such as a Ford tractor, having a rear axle housing 11 and power-liftable rock arms 12 connected to the conventional tractor hydraulic system, as is well-known in the art. The rear axle housing is also surmounted by a control bracket 13 pivoted, as at 14, to the rear axle housing and carrying a trailing top link 15 pivoted thereto for reaction against the hydraulic system control spring 16. The top link is pivoted, as at 17, to the upper end of an A-frame 18 of an implement 19 such as a plow. The implement cross shaft 20 is connected to the tractor by means of trailing laterally spaced draft link structures 21 of the present invention.

More specifically, the draft link structures 21 include a front attaching bracket 22 (Figures 4, 5 and 8), the bracket comprising an axially apertured portion 23 receiving therethrough a mounting pin 24 supporting the bracket for movement about a horizontal axis defined by the pin. The threaded inner end of the mounting pin is received by the rear axle housing 11 and the central bracket portion 23 is provided at its outer extremity with a forwardly extending projection 25 having a mounting aperture 26. The inner end of the portion 23 carries a rearwardly extending clevis defined by upper and lower plates 27 welded or otherwise secured to the center portion 23. The plates 27 are provided with vertically registering apertures 28 adapted to receive therethrough a pivot pin 29 for a purpose to be hereinafter more fully described. The upper plate 27 is extended forwardly to provide a second projection 30 identical with the projection 25 and also having an aperture 31 therethrough.

First link elements 32 are each provided with a forward embossment 33 apertured at 34 for registry with the apertures 28. The pivot pin 29 is adapted to extend through the registering apertures 28 and 34 to support the element 32 for lateral swinging movement about a substantially vertical axis. Each of the elements 32 is laterally offset intermediate its length for reasons to become hereinafter apparent, and the intermediate portion is apertured to receive a locking pin 35 extending through a terminal clevis 36 carried by lift arms 37 pivotally connected, as by joint 38, to the rock arms 12. Thus, the link elements 32 may be power-lifted through actuation of the rock arms 12.

Figure 2:
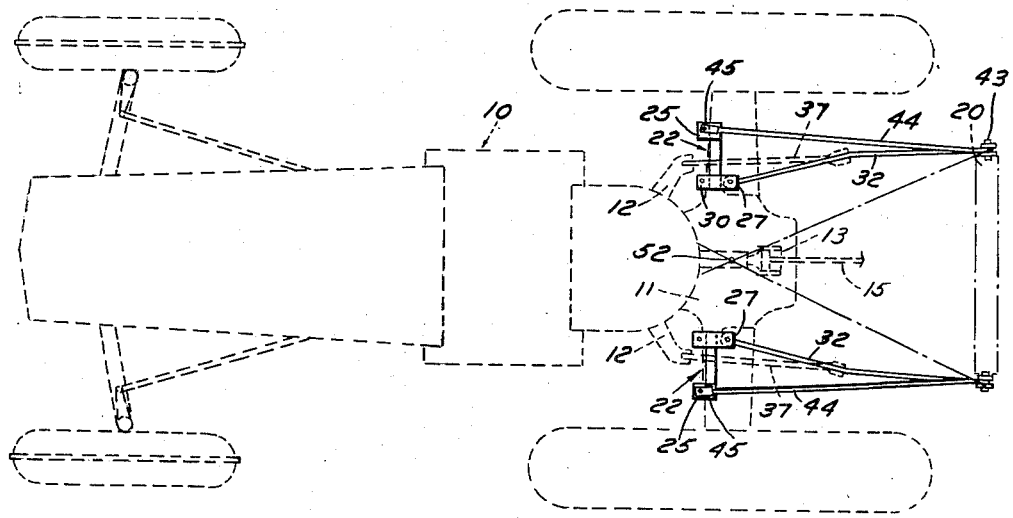
Figure 2 is a plan view of the tractor and hitch links of Figure 1 illustrating the linkage in one adjusted position.

The extreme trailing rear portion of the link element 32 is transversely apertured to receive therethrough a pivot pin 39 joining the element 32 to a normally substantially vertically extending crank arm 40. The crank arm 40 comprises a pair of side plates 41 receiving the terminal end of the element 32 therebetween and apertured to receive the pivot pin 39. The lower extreme ends of the plates 41 carry therebetween a segmental spherical attachment bearing 42 fixedly secured thereto. As best seen in Figures 1, 2 and 3, the segmental spherical attachment bearings 42 are adapted to be secured to laterally extending mounting pins 43 carried by the implement cross shaft 20.

A second link element 44 of substantially greater length than the element 32 is adapted to be attached to either of the bracket projections 25 and 30 by means of a vertical pivot pin 45 extending through an aperture at the forward end of the arm 44 and selectively enterable in either of the apertures 31 and 26 of the projections 30 and 25, respectively. A mounting collar 46 is adapted to be interposed between the forward portion of the arm 44 and the bracket projection to which it is secured to insure vertical clearance between the elements 32 and 44.

The rear end of the element 44 is of reduced thickness, as at 47, for insertion between the plates 41 of the crank arm 40, and a pivot pin 48 is provided to pivotally join the element portion 47 to the crank arm 40. It will be appreciated that the pivot pin 45 may be utilized to secure the forward portion of the arm 44 in either of the positions illustrated in Figures 4 and 5. When the pin 45 is inserted in the aperture 31, the arm 44 occupies the position of Figure 3, the resulting pivoting action of the arms 32 and 44 as a whole is as illustrated in Figure 4. The forward pivoting axes of the arms are substantially longitudinally aligned, and the elements themselves are substantially vertically aligned. Due to the difference in length of the elements, the rear portion of the element 32 will travel in an arc 13a, the rear end of the element 44 will follow an arc 44a, and the center of the attachment bearing will follow an arc 42a. It will be noted that these arcs substantially coincide and the location of the center about which the arcs are generated, i. e., the effective steering point of the implement, will approximate the point 50 of Figure 3 which is in the vicinity of the tractor front axle. Thus, implement steering will follow tractor steering.

When the element 44 is shifted laterally so that the pivot pin 45 is inserted in the aperture 26 of the projection 25, as illustrated in Figure 5, it will be seen that the forward portions of the elements 32 and 44 are substantially laterally spaced, and the elements 32 and 44 are forwardly divergent. Upon relative lateral tractor-implement movement, the arm 32 will again follow the arc 32a, while the rear end of the element 44 will follow the arc 44b and the center of the attachment bearing 42 will follow the arc 42b. The effect of such lateral movement is illustrated in Figure 7, wherein it will be seen that the crank arm 40 is inclined with respect to a vertical plane 51, and the arc 42b followed by the attachment bearing 42 is centered at a point 52 located in the vicinity of the tractor rear axle housing. In Figure 7, the adjusted vertical position of the left crank arm 40 is shown in full lines and the outline of the right crank arm is shown in dotted lines to illustrate the implement steering action as the crank arms are moved. As has been explained in the above identified earlier applications of myself and Ralph C. Frevik, respectively, steering about such a point 52 is desirable where implements such as moldboard plows and disc plows which generate substantial unbalanced side draft forces are utilized.

Thus, it will be seen that the present invention provides an improved tractor-implement linkage wherein vertically extending crank arms adapted for connection to an implement are forced to follow a lateral arc having its center located by the angular relationship of a pair of hitch link elements connected to the crank arm. In other words, the arcuate paths of movement of a pair of hitch elements determine the path of movement of an implement carried by a vertical crank arm joining the elements, and the differential pivoting movement of the elements causes steering of the implement about a desired effective steering point.

It will be understood that the invention is not to be limited to the exact construction shown and described, but that various changes and modifications may be made without departing from the spirit and scope of the invention, as defined in the appended claims.

What is claimed is:

1. A variable convergence linkage for attaching an implement to a tractor comprising a pair of laterally spaced trailing hitch link structures on the tractor, each of said structures including an attaching bracket pivotally secured to the tractor for movement in a vertical plane, a first link element attached to the bracket for lateral swinging movement, a second link element attachable to the bracket at one of a plurality of laterally spaced points, including a first point at which said first and said second elements are substantially vertically aligned and a second point at which said first and said second elements are forwardly divergent, and a vertical crank arm joining the free rear ends of said elements and attachable to an implement to steer the same laterally about an effective steering point determined by the point of attachment of said second element.

2. In an implement-tractor linkage, a pair of laterally spaced forwardly convergent trailing draft link elements having their forward ends operatively attached to a tractor for free lateral swinging movement, vertically extending crank arms on the free rear ends of said draft link elements having attachment bearings at one end thereof, and additional link arms attached at their rear ends to the other ends of said crank arms, means on the forward ends of said link arms and adapted for selective operative attachment to the tractor, the forward ends of said link arms being attachable in vertical alignment with the corresponding ends of said draft link elements whereby said attachment bearings are effectively steered about the theoretical point of convergence of said draft link elements, and said forward ends of said link arms also being attachable in laterally spaced relation to the forward ends of said draft link elements whereby said link arms limit the lateral movement of said attachment bearings to steer the same about a point longitudinally displaced from said theoretical point of convergence.

3. In an implement-tractor linkage, a pair of laterally spaced independent attachment brackets journaled for pivotal movement about a horizontal axis on the tractor, a pair of vertically extending crank arms having attachment bearings respectively adapted for pivotal attachment to an implement, a pair of forwardly converging first link elements joining said crank arms to said brackets and laterally swingable relative to said brackets about vertical pivot axes to normally cause swinging movement of said attachment bearings about the theoretical convergence point of said first link elements, and second link elements each secured to one of said crank arms and selectively attachable to one of said brackets, respectively, at a pair of laterally spaced points including (1) a first point at which said first and second link elements are vertically aligned at said bracket and swinging movement of said attachment bearings occurs about said point of theoretical convergence, and (2) a second point at which said second link elements are pivoted to the brackets in laterally spaced relation to said first elements to modify swinging movement of said attachment bearings so that the implement is steered about an effective point rearwardly of said point of theoretical convergence.

4. In an implement-tractor linkage, a pair of laterally spaced trailing hitch link structures, each including first and second link elements, said first elements being attachable at one end to said tractor and being forwardly convergent toward a theoretical attachment point, a freely swingable vertical crank arm at the other end of each of said first elements for pivoted attachment to the implement, and said second elements each being attachable at one end to the tractor at one of a pair of predetermined laterally spaced points and attachable to said crank arm in vertically spaced relation to said first element, each of said second elements at one of said attachment points being in substantial vertical alignment with the corresponding first element so said implement is steered about said theoretical convergence point, and each of said second elements at a second attachment point being forwardly divergent with respect to said corresponding first element so that the implement is steered about a point displaced from said theoretical convergence point.

References Cited in the file of this patent

UNITED STATES PATENTS

| | | |
|---|---|---|
| 1,916,945 | Ferguson | July 4, 1933 |
| 2,653,825 | Collins | Sept. 29, 1953 |
| 2,673,508 | Richey | Mar. 30, 1954 |